(12) United States Patent
McIlwraith et al.

(10) Patent No.: US 10,391,520 B2
(45) Date of Patent: *Aug. 27, 2019

(54) PRESSURE WAVE GENERATOR WITH A SABOT LAUNCHED PISTON

(71) Applicant: General Fusion Inc., Burnaby (CA)

(72) Inventors: Lon William McIlwraith, Delta (CA); Michel G Laberge, West Vancouver (CA)

(73) Assignee: General Fusion Inc., Burnaby, Brititsh Columbia (CA)

( * ) Notice: Subject to any disclaimer, the term of this patent is extended or adjusted under 35 U.S.C. 154(b) by 372 days.

This patent is subject to a terminal disclaimer.

(21) Appl. No.: 15/211,476

(22) Filed: Jul. 15, 2016

(65) Prior Publication Data
US 2016/0318069 A1 Nov. 3, 2016

Related U.S. Application Data

(63) Continuation of application No. 14/655,639, filed as application No. PCT/CA2014/050085 on Feb. 7, 2014, now Pat. No. 9,403,191.

(Continued)

(51) Int. Cl.
*B06B 1/18* (2006.01)
*F04D 35/00* (2006.01)
(Continued)

(52) U.S. Cl.
CPC ............... *B06B 1/183* (2013.01); *B06B 1/18* (2013.01); *F04D 35/00* (2013.01); *F42D 3/06* (2013.01); *G01V 1/135* (2013.01)

(58) Field of Classification Search
CPC . B06B 1/18; B06B 1/183; F04D 35/00; F42D 3/06
See application file for complete search history.

(56) References Cited

U.S. PATENT DOCUMENTS 2,715,389 A 8/1955 Johnson
2,783,684 A 3/1957 Yoler
(Continued)

FOREIGN PATENT DOCUMENTS

CA 2262581 2/1998
CA 2750441 4/2012
(Continued)

OTHER PUBLICATIONS

International Search Report and Written Opinion for International Patent Application No. PCT/CA2014/050085, dated Apr. 28, 2014, in 7 pages.

(Continued)

*Primary Examiner* — F Daniel Lopez
*Assistant Examiner* — Matthew Wiblin
(74) *Attorney, Agent, or Firm* — Knobbe, Martens, Olson & Bear, LLP

(57) ABSTRACT

Examples of a pressure wave generator configured to generate high energy pressure waves in a medium are disclosed. The pressure wave generator can include a sabot carrying a piston. The sabot can further comprise a locking means to lock the piston in a fixed position when the locking means are activated. When the locking means are in a deactivated position, the piston can be released and can move at least partially away from the sabot. The sabot carrying the piston can be disposed within an inner bore of a housing of the pressure wave generator and can move within the inner bore of the housing from its first end toward its second end along a longitudinal axis of the bore. A transducer can be accommodated in the second end of the housing. The transducer can be coupled to the medium and can convert a portion of the kinetic energy of the piston into a pressure wave in the medium upon impact of the piston with the transducer. The sabot carrying the piston can be accelerated by applying a (Continued)

motive force to the sabot. Once accelerated within the inner bore of the housing the sabot can be decelerated by applying a restraining force to the sabot while the piston can be released at least partially from the sabot to continue to move toward the transducer until it impacts the transducer. Examples of methods of operating the pressure wave generator are disclosed.

20 Claims, 9 Drawing Sheets

Related U.S. Application Data

(60) Provisional application No. 61/762,495, filed on Feb. 8, 2013.

(51) Int. Cl.
*F42D 3/06* (2006.01)
*G01V 1/135* (2006.01)

(56) References Cited

U.S. PATENT DOCUMENTS

| | | | |
|---|---|---|---|
| 3,186,304 | A | 6/1965 | Biehl |
| 3,309,967 | A | 3/1967 | Taplin |
| 3,341,189 | A | 9/1967 | Rollin |
| 3,346,458 | A | 10/1967 | Schmidt |
| 3,465,639 | A | 9/1969 | Cooley |
| 3,465,742 | A | 9/1969 | Herr |
| 3,503,472 | A | 3/1970 | Axthammer |
| 3,631,760 | A | 1/1972 | Moran |
| 3,678,745 | A | 7/1972 | Teng |
| 3,753,304 | A | 8/1973 | Hughes |
| 3,990,351 | A | 11/1976 | Sundin |
| 4,026,192 | A | 5/1977 | Noren et al. |
| 4,049,367 | A | 9/1977 | Tominaga et al. |
| 4,068,147 | A | 1/1978 | Wells |
| 4,164,904 | A | 8/1979 | Laviolette |
| 4,196,788 | A | 4/1980 | Sciard |
| 4,284,164 | A | 8/1981 | Airhart |
| 4,367,130 | A | 1/1983 | Lemelson |
| 4,385,880 | A | 5/1983 | Lemelson |
| 4,449,892 | A | 5/1984 | Bentley |
| 4,676,136 | A | 6/1987 | Kalin |
| 4,759,293 | A | 7/1988 | Davis, Jr. |
| 4,791,850 | A | 12/1988 | Minovitch |
| 4,930,355 | A | 6/1990 | Heck |
| 5,087,435 | A | 2/1992 | Potter et al. |
| 5,114,261 | A | 5/1992 | Sugimoto et al. |
| 5,394,131 | A | 2/1995 | Lungu |
| 6,252,622 | B1 | 6/2001 | Laberge |
| 6,532,887 | B1 | 3/2003 | Venier et al. |
| 6,660,997 | B2 | 12/2003 | Laberge et al. |
| 6,837,145 | B1 | 1/2005 | McBride et al. |
| 7,100,494 | B2 | 9/2006 | Petersen et al. |
| 7,559,542 | B2 | 7/2009 | Cotter |
| 7,775,148 | B1 | 8/2010 | McDermott |
| 8,537,958 | B2 | 9/2013 | Laberge et al. |
| 8,887,618 | B2 | 11/2014 | McIlwraith et al. |
| 8,891,719 | B2 | 11/2014 | Howard et al. |
| 9,403,191 | B2 * | 8/2016 | McIlwraith ............... F42D 3/06 |
| 2005/0129161 | A1 | 6/2005 | Laberge |
| 2006/0198483 | A1 | 9/2006 | Laberge |
| 2006/0198486 | A1 * | 9/2006 | Laberge ................... G21B 3/00 |
| | | | 376/150 |
| 2006/0254520 | A1 | 11/2006 | Rostoker et al. |
| 2006/0267504 | A1 | 11/2006 | VanDrie et al. |
| 2007/0058770 | A1 | 3/2007 | Fissenko et al. |
| 2007/0096659 | A1 | 5/2007 | Monkhorst et al. |
| 2007/0158534 | A1 | 7/2007 | Monkhorst et al. |
| 2007/0172017 | A1 | 7/2007 | Rostoker et al. |
| 2009/0059718 | A1 | 3/2009 | Tessien |
| 2009/0213976 | A1 | 8/2009 | Gioscia et al. |
| 2010/0163130 | A1 | 7/2010 | Laberge et al. |
| 2011/0271825 | A1 | 11/2011 | Howland |
| 2011/0293056 | A1 | 12/2011 | Slough |
| 2014/0247913 | A1 | 9/2014 | Laberge et al. |
| 2015/0036777 | A1 | 2/2015 | Howard et al. |
| 2015/0152899 | A1 | 6/2015 | McIlwraith et al. |

FOREIGN PATENT DOCUMENTS

| | | |
|---|---|---|
| JP | 50-120100 | 9/1975 |
| JP | 58-22675 | 2/1983 |
| KR | 20140146293 A | 12/2014 |
| WO | WO 91/10242 | 7/1991 |
| WO | WO 93/23587 | 11/1993 |
| WO | WO 96/36969 | 11/1996 |
| WO | WO 2010/114360 A1 | 10/2010 |
| WO | WO 2012/113057 A1 | 8/2012 |
| WO | WO 2014/121401 A1 | 8/2014 |

OTHER PUBLICATIONS

International Preliminary Report on Patentability in corresponding International Patent Application No. PCT/CA2014/050085, dated Aug. 11, 2015, in 4 pages.
Davis, Eric W., "Advanced Propulsion Study," Warp Drive Metrics, Air Force Research Laboratory, AFRL-PR-ED-TR-2004-0024, Sep. 2004, in 103 pages.
Thomas S. Duffy et al., "Compressional sound velocity, equation of state, and constitutive response of shock-compressed magnesium-oxide", Journal of Geophysical Research, vol. 100, No. B1, Jan. 10, 1995, pp. 529-542.
M. Delage et al., "Progress Towards Acoustic Magnetized Target Fusion: An Overview of the R&D Program at General Fusion", 33rd Ann. Conf. Can. Nuc. Soc., Jun. 2012, in 13 pages.
C. Derose et al., "Model and Sabot Design and Launching Techniques," NASA-Ames Research Center, 1970, in 89 pages.
R.S. Hawke, "Design and Analysis of Isentropic Compression Experiments", Lawrence Livermore Laboratory, Preprint UCRL-81797, May 7, 1979, in 23 pages.
Robert S. Hixson et al., "Shock Compression Techniques for Developing Multiphase Equations of State", Los Alamos Science, No. 28, Jan. 2003, pp. 114-119.
R.G. Kraus et al., "Equation of state of ductile granular materials", DYMAT International Conference on Mechanical and Physical Behaviour of Materials, Sep. 2009, pp. 1317-1323.
Michel Laberge, "Experimental Results for an Acoustic Driver for MTF," Journal of Fusion Energy, Jun. 2009, vol. 28, No. 2, pp. 179-182, available Jun. 2008.
CH. Mangeant et al., "Syrinx Project: Compact Pulse-Current Generators Devoted to Material Study Under Isentropic Compression Loading", in Pulsed Power Plasma Science, IEEE, Jun. 2001, in 4 pages.
B. E. McDonald, "Modeling nonlinear compressional waves in marine sediments", Nonlin. Processes Geophys., vol. 16, Feb. 26, 2009, pp. 151-157.
Gregory H. Miller et al., "The Equation of State of a Molten Komatiite 1. Shock Wave Compression to 36 GPa", Journal of Geophysical Research, vol. 96, No. B7, Jul. 10, 1991, pp. 11,831-11,848.
W.J. Nellis et al., "Equation of state of shock-compressed liquids: Carbon dioxide and air", American Institute of Physics, J. Chem. Phys., vol. 95 (7), Oct. 1, 1991, pp. 5268-5272.
J. Nguyen et al., "Specifically Prescribed Dynamic Thermodynamic Paths and Resolidification Experiments", Lawrence Livermore National Laboratory, UCRL-JRNL-201169, Nov. 25, 2003, in 8 pages.
D. Orlikowski et al., "New experimental capabilities and theoretical insights of high pressure compression waves", Lawrence Livermore National Laboratory, UCRL-PROC-233023, Jul. 24, 2007, in 10 pages.
V.V. Prut et al., "Metallic Z-pinch method: the isentropic compression of hydrogen", JETP Lett. vol. 29, No. 1, Jan. 5, 1979, pp. 30-33.

(56) References Cited

OTHER PUBLICATIONS

Hitoshi Takeuchi et al., "Equations of State of Matter from Shock Wave Experiments", Journal of Geophysical Research, vol. 71. No. 16, Aug. 15, 1966, pp. 3985-3994.
Logan, B.G., et al., "Compact Torus Accelerator Driven Inertial Confinement Fusion Power Plant HYLIFE-CT," Lawrence Livermore National Laboratory, UCRL-TR-211025, Apr. 1, 2005, in 85 pages.

* cited by examiner

PRESSURE WAVE GENERATOR WITH A SABOT LAUNCHED PISTON

CROSS-REFERENCE TO RELATED APPLICATIONS

This application is a continuation of U.S. patent application Ser. No. 14/655,639, filed Jun. 25, 2015, entitled "PRESSURE WAVE GENERATOR WITH A SABOT LAUNCHED PISTON," which is a U.S. national stage under 35 U.S.C. § 371 of International Application No. PCT/CA2014/050085, filed Feb. 7, 2014, entitled "PRESSURE WAVE GENERATOR WITH A SABOT LAUNCHED PISTON," which claims the benefit of U.S. Provisional Application No. 61/762,495, filed Feb. 8, 2013, entitled "PRESSURE WAVE GENERATOR WITH A SABOT LAUNCHED PISTON;" all of which are hereby incorporated by reference herein in their entireties.

Any and all applications for which a foreign or domestic priority claim is identified in the Application Data Sheet as filed with the present application are hereby incorporated by reference herein in their entireties under 37 CFR 1.57.

TECHNICAL FIELD

The present disclosure relates generally to a pressure wave generator for generating pressure waves in a medium.

BACKGROUND

Sabot launched projectiles have been used in artillery for over two hundred years. The use of a sabot allows projectiles to be launched from a gun barrel. Once used, the sabot is discarded and subsequently destroyed as soon as it exits the gun barrel, at which time its function is over and the sabot launched projectile is released to continue on its trajectory.

Pressure wave generators can be used to create pressure waves that may be used to compress a medium, transfer part of the pressure wave energy to that medium, generate energy in the medium due to concentration of the pressure wave energy, and/or initiate chemical reactions or physical changes in the medium. The medium may be a solid, liquid, gas, and/or plasma.

Various methods can be used for launching a pressure wave in a medium, such as applying direct mechanical impact on the surface coupled to the medium, detonation, explosions, electrical sparks, intense radiation beams, oscillating and amplifying mechanisms, etc.

Examples of pressure wave generators are described in the commonly owned U.S. Patent Application Publication No. 2010/0163130 and International Patent Application (PCT) Publication No. WO 2012/113057, which are incorporated by reference herein in their entirety. These two publications describe examples of a pressure wave generator for generating a pressure wave (or a plurality of pressure waves) in a medium. Any of the example pressure wave generators, components of the generators, or methods for operating generators described in any of these publications can be used with the embodiments of pressure wave generation apparatus and methods described herein. The pressure wave can be used to compress the medium and increase its temperature, pressure, energy, and/or density. The pressure wave can be generated by a mechanical impact of an accelerated piston on a transducer coupled to the medium. The transducer can at least partially convert kinetic energy of the movable piston into a pressure wave in the medium.

The piston in a pressure wave generator can be made from heat treated steel with features machined into it for bearing rings, seals, a control rod, control rod attachments and other devices. These features can be complex to produce, can disturb uniformity of the piston, and can introduce stress concentrations in corners and cavities leading to premature failure in use of the piston. They can also complicate the heat treatment of the piston, which may lead to failure of the piston, e.g. thermal cracking of the piston.

SUMMARY

In one aspect, a pressure wave generator for generating a pressure wave in a medium is provided. The pressure wave generator comprises a housing, a piston, a sabot, an impact surface, a means for accelerating the sabot, and a means for decelerating the sabot. The housing has an inner bore, a first end and a second end. The sabot releasably carries a piston and is movable within the inner bore of the housing from the first end towards the second end. The impact surface is coupled to the medium and is located at the second end of the housing and is in communication with the inner bore. The means for accelerating the sabot is configured to accelerate the sabot carrying the piston towards the impact surface. The means for decelerating the sabot is configured to decelerate the sabot by applying a restraining force to the sabot so that when the sabot is decelerated the piston is launched forward ahead of the sabot such that it is at least partially separated from the sabot when it impacts the impact surface.

In one aspect, a mass of the piston is larger than a mass of the sabot so that during acceleration the motive force applied to the piston will not accelerate the piston ahead of the sabot while when the sabot is decelerated the motive force applied to the piston will launch the piston ahead of the sabot.

In another aspect, the sabot is a cup shaped with a base and a side wall that extends from the base to define an inner cavity through which the piston is inserted therein. The inner cavity of the sabot is shaped and sized to receive the piston so that a first surface of the piston can contact the base of the sabot.

In one aspect the means for accelerating the sabot carrying the piston comprises a pressurized fluid source. The housing of the pressure wave generator comprises one or more fluid ports in fluid communication with the pressurized fluid source and with a part of the inner bore between the first end and the sabot such that a pressurized fluid can be delivered into the inner bore to accelerate the sabot carrying the piston toward the second end of the housing.

The sabot further comprises one or more ports formed therein to allow the pressurized fluid to flow therethrough and to contact the piston so that it can continue accelerating the piston while the sabot is decelerating.

In one aspect, a locking means is provided to lock the piston to the sabot when the locking means engage the piston and to release the piston from the sabot when the locking means disengage the piston.

The locking means can comprise an electromagnet mounted to the sabot and a power source in electrical communication with the electromagnet. When the power source is turned on the electromagnet is energized generating a magnetic field securing the piston to the sabot. When the power source is turned off, the electromagnet is de-energized so that the piston is released away from the sabot.

The power source can be electrically coupled to the electromagnet by a power line. The pressure wave generator can comprise a control rod coupled to the sabot. The control rod is configured to accommodate the power line.

In yet another aspect the locking means comprises a vacuum source fluidly coupled to ports in the sabot to create vacuum in a sabot's cavity thereby suctioning the piston to the sabot when the vacuum source is turned on.

In one aspect the pressure wave generator comprises a control unit for controlling the locking means and the means for accelerating and decelerating the sabot. The control unit is configured to operate the means for accelerating and decelerating such that after the restraining force is applied to the sabot and the piston is at least partially separated from the sabot, the sabot continues moving forward to re-engage the piston at an impact point. The control unit is configured to operate the means for accelerating and decelerating such that the velocity of the sabot decelerating toward the impact point is less than the velocity of the piston accelerating toward the impact surface. The control unit further operates a means for returning the sabot carrying the piston to the first end of the housing for re-launching.

In another aspect, an apparatus is provided with a piston and a sabot configured to releasably carry the piston along a pathway. The apparatus further comprises a locking means to lock the piston to the sabot when the locking means engages the piston and to release the piston from the sabot when the locking means disengages the piston, means for accelerating the sabot carrying the piston, means for decelerating the sabot to launch the piston forward ahead of the sabot such that the piston is at least partially separated from the sabot, a position sensor configured to detect the position of the sabot in the pathway and a control unit to control a launch of the piston. The control unit communicates with the position sensor, locking means, and means for decelerating the sabot and is configured to determine the position of the sabot from a position signal it receives from the position sensor. When the sabot reaches a specified position the control unit sends a signal to the locking means to release the piston and to the means for decelerating the sabot to apply a restraining force to the sabot such that the piston is launched forward and is at least partially separated from the sabot while the sabot decelerates.

The sabot continues moving forward to re-engage the piston at an impact point. The control unit is further configured to operate a means for returning the sabot carrying the piston to a starting position for re-launching.

In one aspect a method for generating a pressure wave in a medium is provided. The method comprises accelerating a sabot releasably carrying a piston towards an impact surface coupled to a medium, then decelerating the sabot before reaching the impact surface thereby causing the piston to separate from the sabot and proceed towards the impact surface until it impacts the impact surface, driving the sabot towards an impact point to re-engage with the piston and returning the sabot carrying the piston to a start position for re-launching.

The method further comprises a step of locking the piston to the sabot during acceleration of the sabot and unlocking the piston from the sabot during deceleration of the sabot.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

The present disclosure describes a piston 1 with a separate sabot 2 that can be used as a carrier of the piston. Certain features such as bearings, seals, rod attachment and/or any other features can be machined into the sabot 2 so that the piston 1 can be a simple geometrical shape which can be less expensive to manufacture, more easily heat treated, more durable (no stress concentrations in corners and cavities since there are no corners or cavities in the piston). In addition, the piston can be quickly and easily replaced in case of any damage without disturbing the sabot or devices attached to the sabot. The sabot 2 can be used to launch the piston 1 down a tube or a barrel towards an impact surface. A short distance before the impact, the piston 1 can be released from the sabot 2 to continue its motion until the impact. The sabot 2 is not discarded and can be used for subsequent piston retraction and further launch/retraction cycles.

Figure 1:
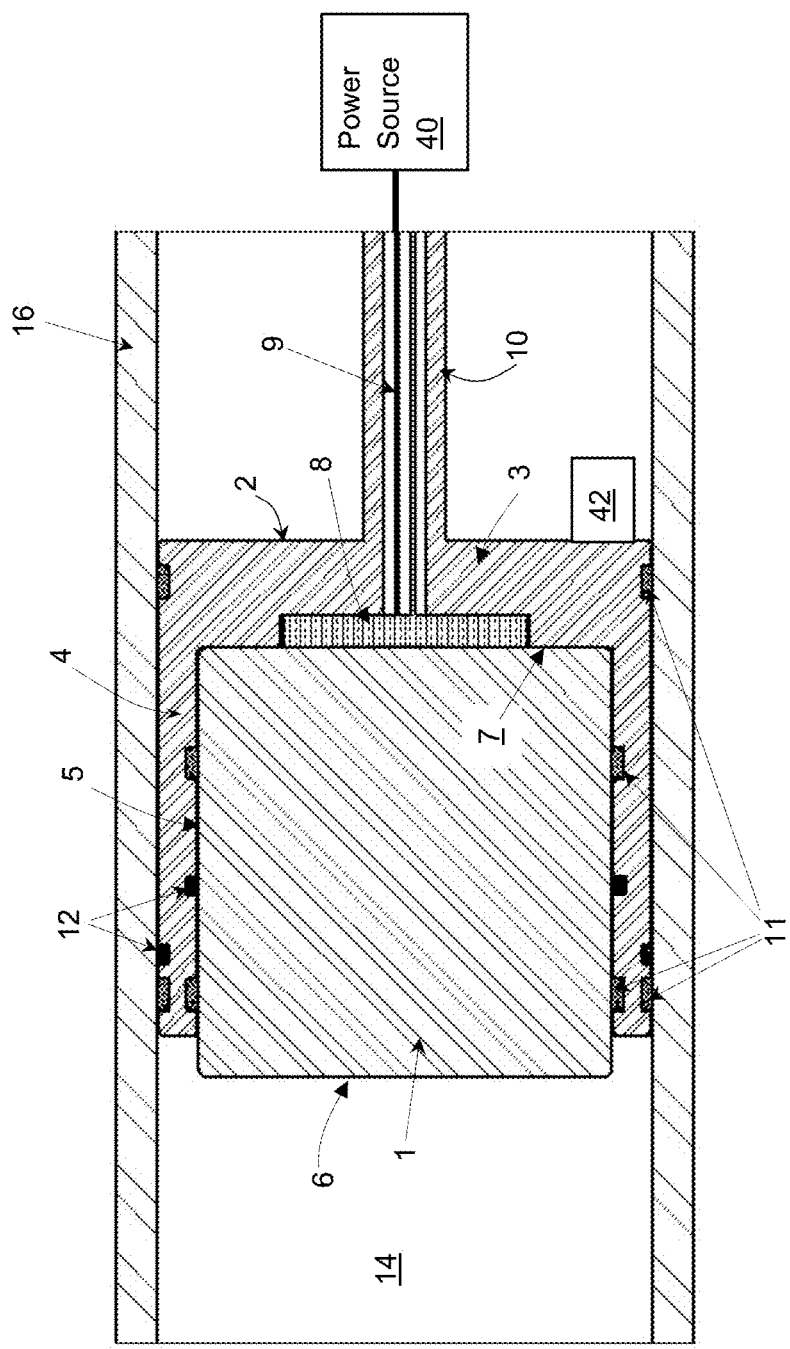
FIG. 1 is a partial cross-sectional view of an example of a pressure wave generator schematically showing a sabot and a piston inserted into a sabot's cavity.
Figure 1A:
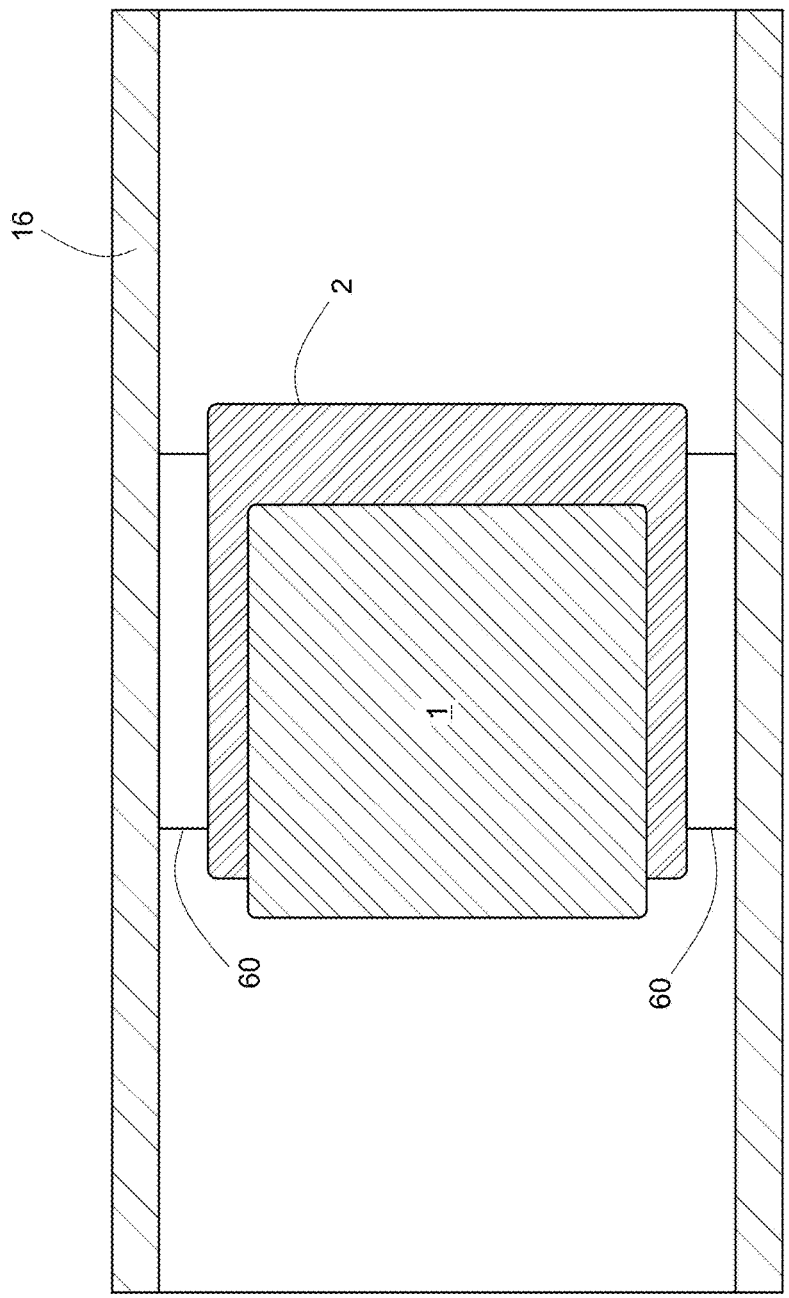
FIG. 1A is a partial cross-sectional view of an example of a pressure wave generator schematically showing a permanent magnet around the sabot.

An example of a piston 1 accelerated and launched by a sabot 2 is illustrated in FIG. 1. The piston 1 can have a simple cylindrical shape with no features machined onto it. The piston 1 can have a first, front, surface 6 and a second, rear, surface 7. For example, the piston 1 can have a cylindrical body or any other suitable shape for that matter, with a diameter of about 50-500 mm, a mass of about 5-200 kg and a height of about 50-500 mm. Persons skilled in the art would understand that the piston 1 can have any other shape and/or dimension that can be configured to be carried by the sabot 2. The piston 1 can be formed from a rigid material such as a metal. A wide range of materials can be used for fabricating the piston 1 and/or the sabot 2. For example any forging steel with sufficient strength to withstand the impacts can be used for fabricating the piston 1 and/or the sabot 2. Since the sabot 2 is a non-impacting component it can be made of different, less expensive, materials.

In one implementation, the sabot 2 can be thin and light so that the mass of the sabot 2 can be less than the mass of the piston 1. The sabot 2 can have a cup-shaped body with a base 3 and an annular side wall 4 extending from the base 3, and an open top. The base 3 and the side wall 4 can form an inner cavity 5 into which the piston 1 can be inserted and positioned. The cavity 5 can be configured so that the piston 1 can be position therein so that the piston's rear surface 7 can press against the base 3. Once the piston 1 is inserted within the cavity 5 it can stay therein during the acceleration of the sabot 2 due to the acceleration force driving the sabot 2 forward. Once the sabot 2 is decelerated the piston 1 can be launched forward due to its inertia.

The sabot 2 can further comprise means for releasably securing the piston 1 into the cavity 5. In an implementation shown in FIGS. 1-7, an electromagnet 8 can be used to lock the piston 1 in fixed position within the cavity 5 of the sabot 2. The electromagnet 8 can be mounted at the base 3 of the sabot 2. The electromagnet 8 can be energized by a power source 40 through power conduits, such as a power line 9. When the power source 40 is turned on, the electromagnet 8 can be energized generating a magnetic field that can lock the piston 1 in a fixed position within the sabot's cavity 5. When the power source 40 is turned off, the electromagnet 8 de-energizes and the piston 1 can be released and removed out of the sabot 2. In one implementation, the piston 1 can be secured in fixed position within the cavity 5 by providing a vacuum within the cavity so that the piston 1 can be sucked and pressed tightly against the inner surface of the bottom wall 3. For example, a vacuum pump 42 can be mounted at the base 3 and the sabot 2 can comprise one or more ports so that the vacuum pump 42 is in communication with the inner cavity 5 through such ports. When the vacuum pump 42 is turned on, the piston 1 can be kept in fixed position within the cavity 5 by suction while when the vacuum pump 42 is turned off the piston can be released out of the cavity 5. In another implementation, the piston 1 can be mechanically secured to the sabot 2 utilizing a hook, a retaining ring, a pin or any other fastener or combination of fasteners configured to detachably secure the piston 1 to the sabot 2.

The sabot can further comprise a control rod 10 to control the acceleration of the sabot 2. The control rod 10 can be connected to the base 3 of the sabot 2. A brake mechanism 36 can be configured to apply restraining force to the control rod 10. So, the control rod 10 can provide a surface 37 on which a restraining force, provided by for example a brake 36, can be applied. The brake mechanism 36 may comprise a magnetic eddy current brake 38 (shown in FIG. 3), a frictional brake etc. The control rod 10 can be hollow and can be adapted to accommodate power lines 9 to the electromagnet 8. In addition, the control rod 10 can be used for monitoring sabot position by employing for example an optical linear encoder as described in U.S. Patent Application Publication No. 2010/0163130 incorporated by reference herein in its entirety. Other devices, such as, optical interferometer, microwave interferometer, magnetic linear encoder, can be used for measuring the position of the sabot 2 and/or piston 1 without limiting the scope of the present invention.

In one implementation, the control rod 10 can be omitted. In such case the sabot can be decelerated by applying magnetic force directly to the sabot 2 (e.g. permanent magnet 60 around the sabot).

The sabot 2 can further comprise one or more bearing rings 11 and one or more seal rings 12 mounted at an outer and/or an inner surface of the annular wall 4. The sabot 2 and the piston 1 can be inserted into a bore 14 of a pressure wave generator's housing 16. The housing 16 of a pressure wave generator 20 (FIG. 2) can by cylindrically shaped defining the inner bore 14. This is illustrative only and not limiting and the housing 16, the inner bore 14, the sabot 2 and the piston 1 can have any other suitable shapes (e.g., different cross-sectional shapes).

Figure 2:
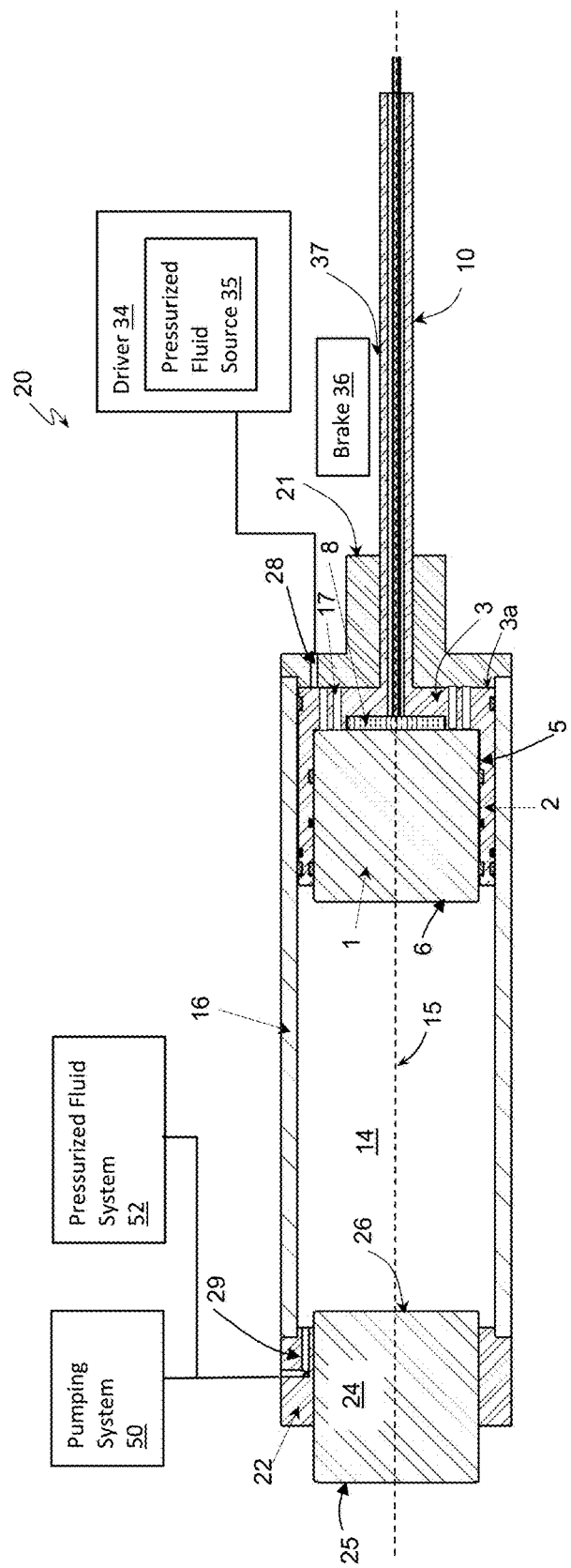
FIG. 2 is a cross-sectional view of an example of a pressure wave generator of FIG. 1 schematically showing a sabot carrying a piston at a starting position.
Figure 2A:
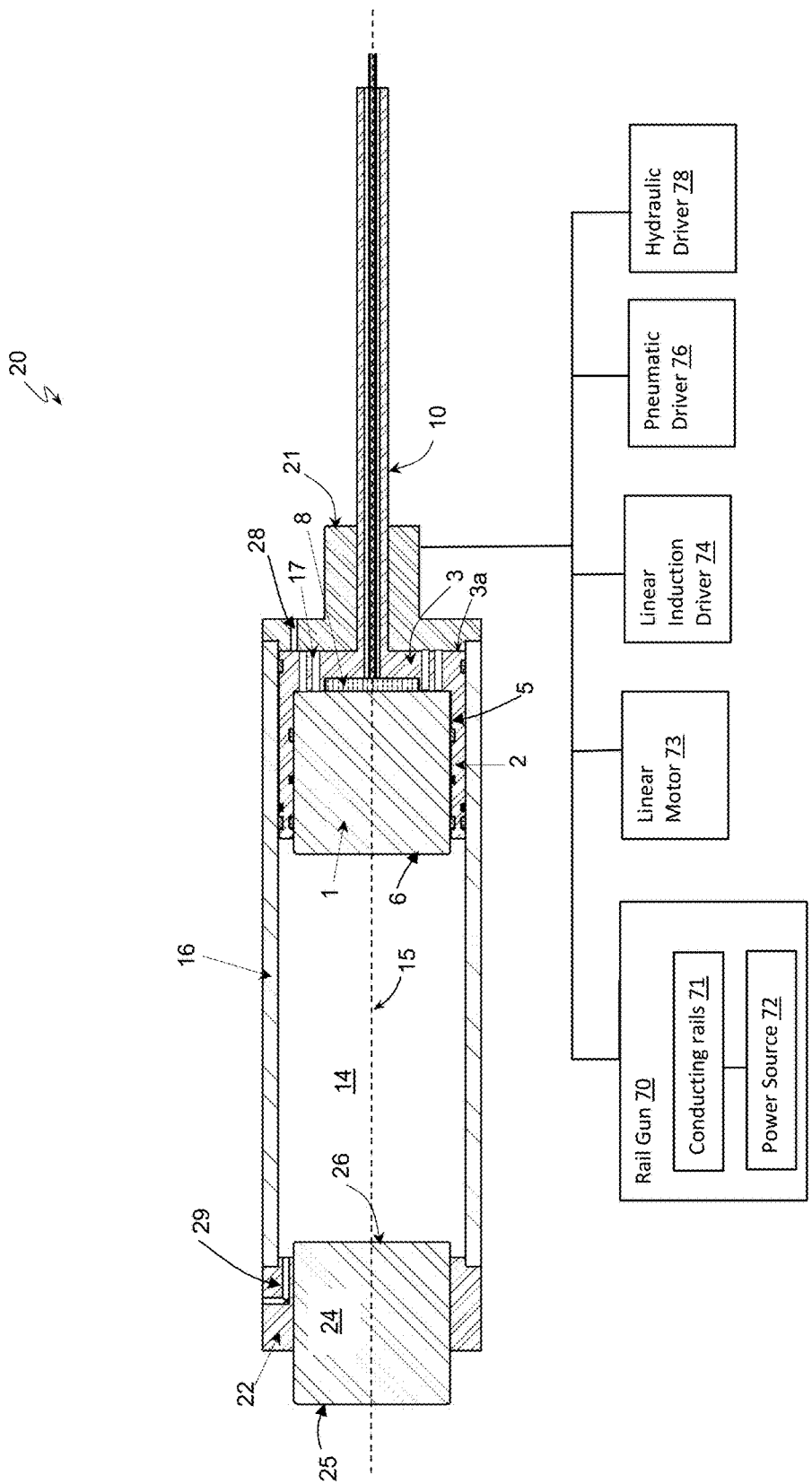
FIG. 2A is a cross-sectional view of an example of a pressure wave generator of FIG. 1 schematically showing the sabot carrying the piston at the starting position

FIG. 2 illustrates a cross-sectional view of an embodiment of the pressure wave generator 20, partially illustrated in FIG. 1. The housing 16 can comprise a first end 21 and a second end 22. The first end 21 of the housing 16 may be at least partially closed and the control rod 10 can project at least partially outside the first end 21 of the housing 16. The second end 22 of the housing 16 may be an open end into which a transducer 24 can be mounted. The transducer 24 can comprise a front surface 25 and an impact (back) surface 26. The front surface 25 of the transducer 24 can be coupled to a medium, such as a solid, a liquid, a gas, and/or a plasma, into which a pressure wave can be generated. The impact surface 26 of the transducer 24 faces the housing's inner bore 14 and the front surface 6 of the piston 1. In one implementation, the transducer 24 can be slidably accommodated into the housing's second end 22 so that it can be capable of being slightly displaced axially relative to the second end 22 of the housing 16 during an impact by the piston 1. The transducer 24 further includes a holding mechanism (not shown) which can prevent dislodgement of the transducer 24 into the medium when impacted by the piston 1. In another implementation, the transducer 24 can be omitted and the impact surface 26 can be a wall, e.g. a wall of a chamber comprising a medium into which the pressure wave can be generated, or a wall of such medium.

The sabot 2 and the piston 1 can be accelerated within the inner bore 14 from the first end 21 towards the transducer 24 along the bore axis 15. The sabot 2 can be accelerated by a driver 34, for example, a compressed fluid or electrically, such as a rail gun 70 having conducting rails 71 and a power source 72, a linear motor 73, or a linear induction driver 74. In the example of the pressure wave generator 20 shown in FIG. 2, the sabot 2 carrying the piston 1 can be accelerated using compressed fluid as a driving force. This is intended to be illustrative only and not limiting and any other suitable electrical, pneumatic 76 and/or hydraulic 78 driving force can be used without departing from the scope of the invention.

The example of the pressure wave generator 20 illustrated in the FIG. 2, can include one or more fluid ports 28 formed at the first end 21 of the housing 16 through which the inner bore 14 communicates with a source of pressurized fluid 35, e.g. a pressure vessel (not shown). The pressure vessel can store a pressurized fluid (e.g., gas) that can flow through the ports 28 into a space behind the sabot 2 to accelerate the sabot 2 carrying the piston 1 along the bore's axis 15 toward the transducer 24. In the embodiments of pressure wave generator 20 using a compressed fluid as a driving force, one or more ports 17 can be formed into the base 3 of the sabot 2 so that the pressurized fluid can flow through the ports 17 to contact the piston 1. When the restraining force is applied to the sabot 2 to decelerate it, the pressurized fluid can continue accelerating the piston 1 once the sabot 2 is decelerated. The ports 17 can be formed along the central part of the base 3, for example around the electromagnet 8. The edge rim of the base 3 can be free of any ports or recesses forming a solid rim 3*a*. The sabot 2 can be thin and light so that less restraining force can provide the desired amount of deceleration of the sabot 2 and launching of the piston 1. In some embodiments the mass of the sabot 2 can be less than the mass of the piston 1. When the compressed fluid is provided through the ports 28 behind the sabot, the sabot carrying the piston will accelerate with the speed proportional to the applied driving force. Since the mass of the sabot is less than the mass of the piston, the force applied to the piston through the ports 17 will not accelerate the piston 1 ahead of the sabot 2. The piston 1 can remain within the cavity 5 of the sabot 2 during the acceleration of the sabot 2. When the restraining force is applied to the sabot 2, e.g. by applying brake 36 to the rod 10 or to the sabot 2, the sabot 2 will start decelerating and the piston 1 can launch forward such that its second surface 7 separates from the base 3 (see FIG. 4). The sabot 2 may not come to a stop but can rather continue moving slowly forward toward the second end 22 of the housing. The velocity of the sabot moving forward during it deceleration is much lower than the velocity of the piston 1 so that when the piston 1 impacts the impact surface 26 the sabot 2 is separated and away from the impact surface 26 and the second end 22 of the housing 16.

In some implementations of the pressure wave generator 20, a control unit (not shown) can be provided to control the timing of the piston launch. The timing of the piston launch can be precisely measured and/or controlled to provide improved control of the timing of impact with the transducer 24. In one example of a method for launching the piston 1 toward the transducer 24, the pressurized fluid can be brought behind the sabot 2 while the sabot 2 is kept in a steady position by applying the restraining force to the sabot 2 or the control rod 10. At launch, the restraining force can be released rapidly and the force of the pressurized fluid can accelerate the sabot 2 carrying the piston 1 toward the transducer 24. In one embodiment, the pressurized fluid can be supplied into a volume behind the sabot (between the base 3 and the first end 21 of the housing 16) while the sabot is kept steady in place by the applied restraining force. The piston 1 can be locked within the cavity 5 by activating the electromagnet 8. Then the restraining force can be released and the pressurized fluid in the volume behind the sabot can provide a motive force to accelerate the sabot 2. Size and position of the ports 28 and/or the volume behind the sabot can vary depending on the dimensions of the housing 16, sabot 2, piston 1 and the desired driving force. For example, some of the ports 28 can be positioned around the housing 16 in proximity to its first end 21 as described in details in the International patent application (PCT) Publication No. WO 2012/113057, incorporated by reference herein in its entirety.

In the illustrated embodiment in FIG. 2, the sabot 2 carrying the piston 1 is in an initial, starting, position. In the initial position the electromagnet 8 can be energized by triggering the power source thus locking the piston 1 into the cavity 5 of the sabot 2. The inner bore 14 of the housing 16 can be evacuated with a pumping system 50 (e.g. using one or more ports 29 positioned near the second end 22 of the housing 16) forming at least partial vacuum region in the bore 14 ahead of the piston 1. In some implementations, the inner bore 14 can be at least partially evacuated by the pumping system 50 so that pressure within the inner bore is reduced relative to the ambient pressure.

Figure 3:
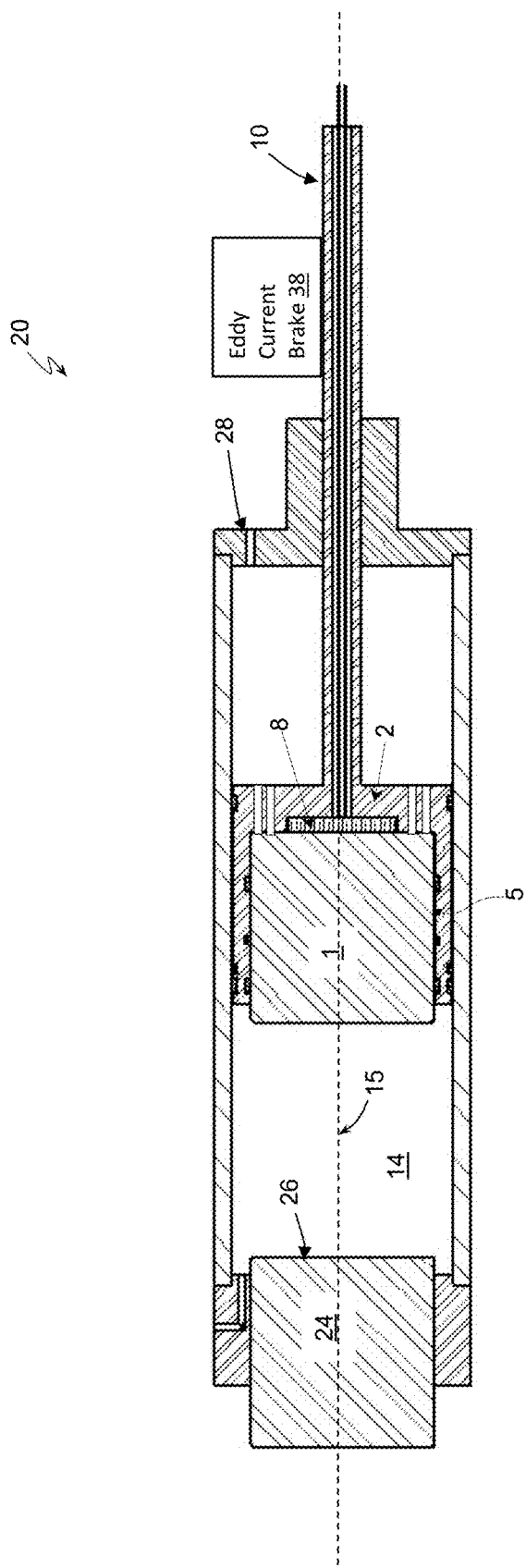
FIG. 3 is a cross-sectional view of an example of a pressure wave generator of FIG. 1 showing a sabot carrying a piston accelerating toward an impact surface.
Figure 4:
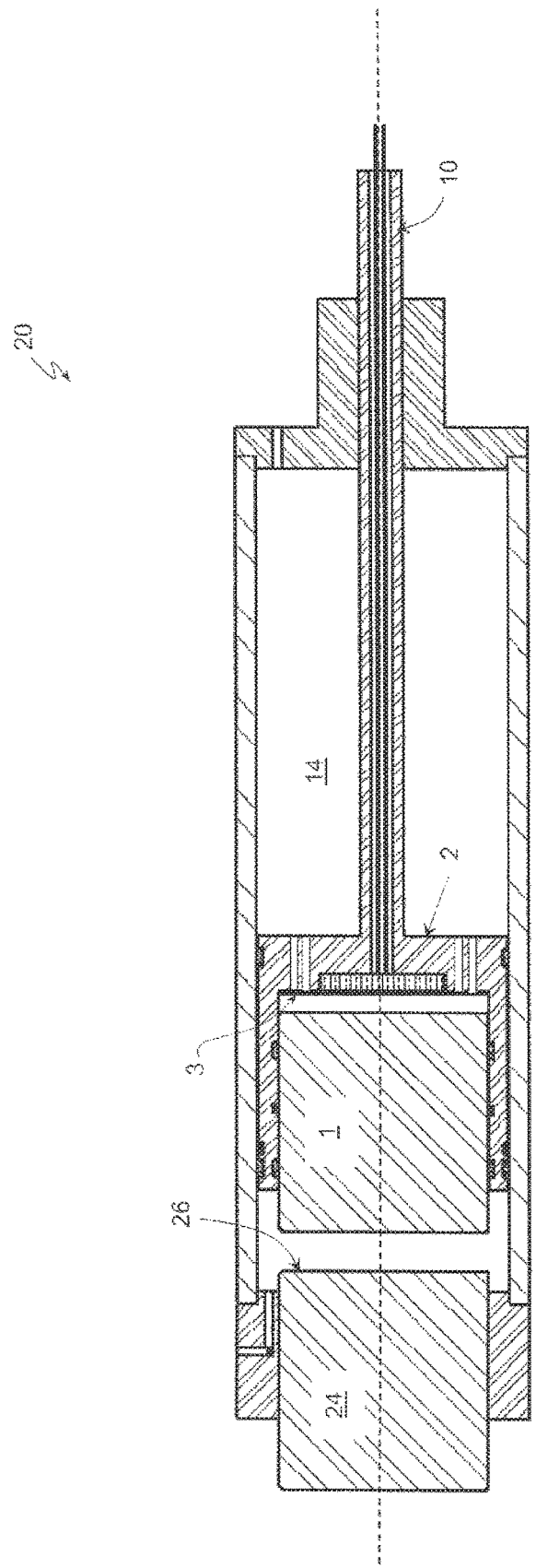
FIG. 4 is a cross-sectional view of an example of a pressure wave generator of FIG. 1 showing a sabot that is decelerated while a piston is launched forward toward an impact surface.
Figure 5:
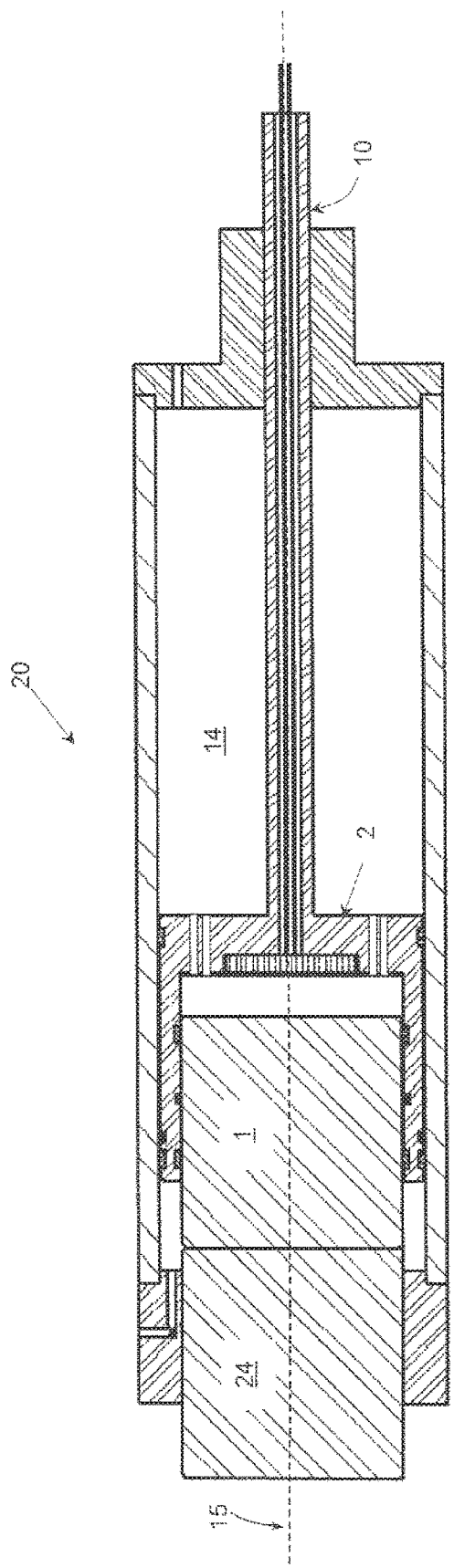
FIG. 5 is a cross-sectional view of an example of a pressure wave generator of FIG. 1 showing a piston impacting an impact surface at an impact point and a sabot slowly decelerating towards the piston.

FIG. 3 schematically illustrate an example of a pressure wave generator 20 with the sabot 2 and the piston 1 accelerated toward the transducer 24. The driving force, such as for example compressed fluid, can be applied behind the sabot accelerating the sabot 2 carrying the piston 1 toward the transducer 24. The electromagnetic device 8 can still be energized securing the piston 1 into the sabot 2. In one implementation, once the sabot 2 is accelerated, the electromagnet 8 can be de-energized by turning off the power source. Due to the forward acceleration the sabot 2 carrying the piston 1 accelerates toward the transducer 24. When the sabot 2 is at a specified location in the bore 14, e.g. ⅔ of the length of the bore 14 or at some distance before the impact surface 26 (see FIG. 4), a brake can be applied to the sabot, by for example applying a braking force to the control rod/sabot, to decelerate the sabot 2. As the sabot 2 decelerates, the piston 1 can launch forward toward the transducer 24 due to its inertia and the compressed air passing through the ports 17, until it impacts the transducer 24 (see FIG. 5). When the piston 1 impacts the transducer 24, it transfers at least part of its kinetic energy to the transducer 24. On impact, the transducer may be elastically compressed and can at least partially convert the kinetic energy of the piston into a pressure wave in the medium. When pressure waves are associated with large impact velocities of the piston on the transducer (e.g., velocities greater than about 10 m/s in some cases), such waves can cause local pressures which may exceed 1 GPa in some implementations of the generator 20. In one implementation, the transducer 24 can be axially displaced at least partly into the medium. The sabot 2 continues to slowly move forward until it re-engages the piston 1 again (see FIG. 6).

The acceleration and launching of the piston 1 can be precisely controlled by controlling the means for acceleration and deceleration of the sabot 2, such as the brake 36 and the driving system 34 (e.g. compressed fluid 35) and in some implementations by controlling the locking means (e.g. power driver of the electromagnet 8). The control system may include one or more processors, controllers, or general or special purpose computing hardware. In various implementations, the control system can control acceleration of the sabot 2, launching of the piston 1, impact timing between the piston 1 and the transducer 24 and/or can control speed and/or location of the sabot 2 and/or piston 1 for at least a portion of the sabot/piston's movement within the generator 20. In one implementation, the control system can receive the signal of the sabot's position from the position sensor (e.g. an encoder) as an input and can send output signals to the brake to decelerate the sabot 2 and to the locking means to disengage the piston 1 to launch it toward the impact surface 26. The control system can make adjustments to, for example, applied driving force, applied braking force, and so forth in order to adjust launching time, impact force and/or impact time. The control system can include or be in communication with one or more computer-readable storage media that can be used to store, persistently or otherwise, the control information. The control unit can further control a means for returning the sabot carrying the piston to a start position for re-launching. For example, the returning means can comprise a source 52 for pressurized fluid and one or more fluid ports, e.g. ports 29 formed at the second end 22 of the housing 16. In one mode of operation, the ports 29 can be in fluid communication with the pressurized fluid source 52 while in another mode of operation the ports 29 can be in fluid communication to the pumping system 50 to evacuate the inner bore 14 as described herein above. The pressurized fluid can be delivered in an inner bore between the transducer 24 and the sabot to drive the sabot carrying the piston back to the starting position in proximity to the first end of the housing 16. The control unit can send a signal to the returning means to open the communication between the ports 29 and the source of pressurized fluid (e.g. open a valve) to allow flow of the pressurized fluid to push the sabot carrying the piston to its starting position. When the returning means are initiated, the ports 28 (formed at the first end) can be used to vent out the pressurized fluid injected previously during the acceleration of the sabot. Once the sabot 2 carrying the piston 1 is at the starting position, the control unit can close the valve between the ports 29 and the source of pressurized fluid. Then the control unit can send a signal to the pumping system to evacuate the inner bore 14 of the pressure wave generator 20. In some implementations, the returning means can comprise a mechanical hand/hook in communication to a motor so that the hand can engage the sabot and pull/push it back to the starting position. In another implementation, the returning means can comprise a rail gun to retract the sabot carrying the piston to the start position.

In some methods of operation, when the pressure wave generator 20 is in a start position, the sabot 2 carrying the piston 1 can be in the position schematically shown in FIG. 2, in which the piston 1 is positioned within the sabot 2. While in the start position, the control system can send a signal to the locking means, e.g. the electromagnet 8, and the brake to respectively lock the piston 1 to the sabot 2 and apply a braking force to the sabot 2. The control system can then send a signal to the driving system, for example to one or more valves to open to supply pressurized fluid from the pressure vessel. The space of the bore 14 between the transducer 24 and the piston 1 can be at least partially evacuated for example through the one or more ports 29 position near the second end 22 of the housing 16. At a desired time, the control system can signal the brake to decrease or eliminate the restraining force and the sabot carrying the piston can accelerate along the bore 14 toward the transducer 24. The position sensor can send a signal to the control system about the position of the sabot within the bore 14. At a certain position of the sabot within the bore the control system can signal the brake to apply restraining force to the sabot 2 or the control rod 10, and can turn off the electromagnet's power source to de-energize the electromagnet 8. The timing of applying the braking force depends on the velocity of the sabot, the restraining force, distance of the sabot from the impact surface, etc. and can be determined by the control unit. In some implementations, the control unit can make a decision of the launching parameters (timing, velocity trajectory) in real time. As the sabot 2 decelerates due to the applied restraining force, the piston 1 can continue to move toward the transducer 24 until it impacts the impact surface 26 of the transducer 24 transferring its kinetic energy to the transducer 24 and generating a pressure wave into the medium coupled to the transducer 24. When the restraining force is applied to the sabot 2 and consequently it starts decelerating, the piston 1 can continue moving at least partially away from the base 3 of the sabot 2 until it impacts the transducer 24 (see FIG. 5).

Figure 6:
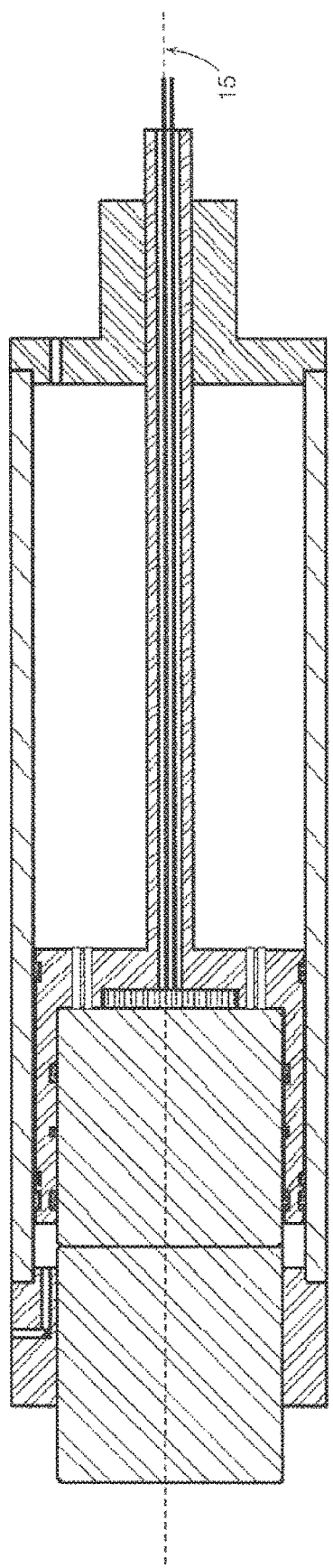
FIG. 6 is a cross-sectional view of an example of a pressure wave generator of FIG. 1 showing the sabot re-attaching the piston at an impact point.
Figure 7:
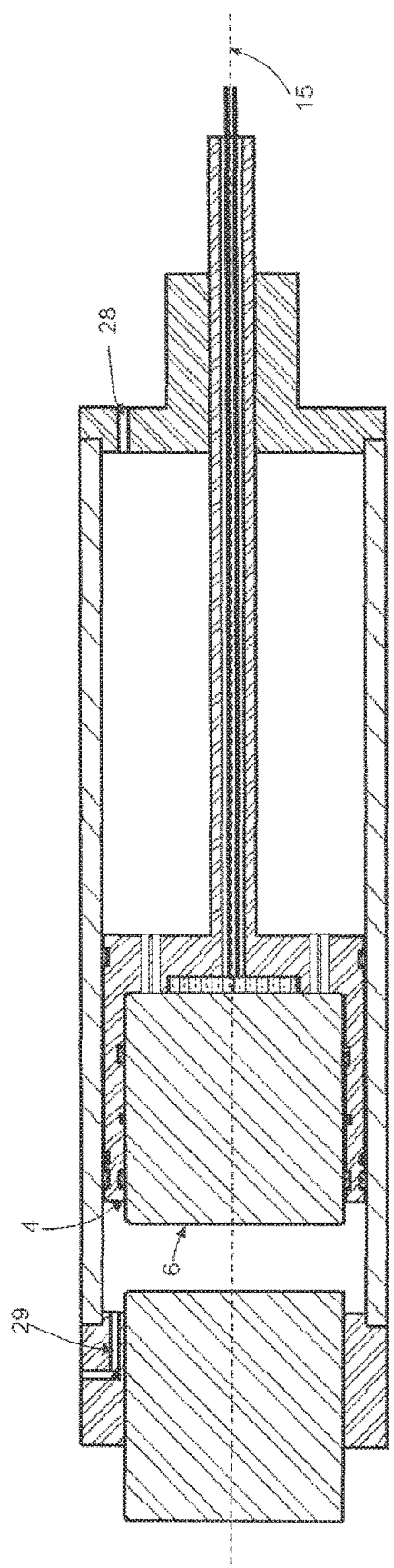
FIG. 7 is a cross-sectional view of an example of a pressure wave generator of FIG. 1 showing a piston locked within a sabot and the sabot carrying the piston retracting from an impact position toward a starting position.

Upon the impact, the decelerating sabot 2 can continue to slowly decelerate along the axis 15 toward the transducer until the piston 1 is again completely inserted within the cavity 5 and piston's rear surface 7 pressed against the base 3 (see FIG. 6). Once the piston 1 is positioned within the cavity 5, the control unit can activate the locking means and the means for returning the sabot carrying the piston to the initial, start position near the first end 21 of the housing 16. The sabot carrying the piston can be returned to the starting position by applying a driving force to the sabot 2 and/or the piston 1. The driving force can be a mechanical, pneumatic, hydraulic or electrical force applied to the sabot 2 and/or the control rod 10. In the example illustrated in FIG. 7 the sabot carrying the piston can be returned to the starting position by applying a compressed fluid through the one or more ports 29 while ports 28 can be used to vent out the compressed fluid injected previously behind the sabot. Once the sabot 2 carrying the piston returns to the starting position, the inner bore 14 of the pressure wave generator 20 can be evacuated. In one implementation, the sabot 2 carrying the piston 1 can be returned to its starting position in a proximity to the first end 21 of the housing 16 by pulling it back or pushing it using some kind of mechanical device (not shown). Any other mechanical, electrical or pneumatic device can be used to return the sabot carrying the piston to its starting position without departing from the scope of the invention.

In some methods of operating the pressure wave generator 20, the piston 1 can be repeatedly impacted on the transducer 24 in successive "shots." Calibration of the timing of the shots, velocity (or kinetic energy or momentum) of the piston, and so forth may be desired. In some cases, to calibrate successive shots of the piston 1 onto the transducer 24, the moment at which the piston 1 impacts the transducer 24, launching time of the piston, the velocity trajectory of the sabot and/or piston, can be accurately determined.

Embodiments of a sabot launched piston system are disclosed. Any of the embodiments of the sabot launched piston system can be used with embodiments of the pressure wave generator. Embodiments of the pressure wave generator can be used to transmit pressure waves into any suitable medium (e.g., solid, liquid, gas, and/or plasma). In some implementations, the pressure wave generator can be used as a press for stamping, embossing, bending, flanging, coining, blanking, punching, or working materials such as, e.g., metals (e.g., metalworking) In some implementations, the medium comprises a liquid, a gas, or a mixture of liquid and gas. In some such implementations, the medium comprises a liquid metal, such as liquid lead or a mixture of liquid lead and lithium. The pressure wave generator can be used to generate pressure waves in the medium, which may raise the pressure, temperature, energy, and/or density of the medium, and may increase the rate of chemical reactions in the medium. For example, embodiments of the pressure wave generator could be used for controlling a piston in a gas-powered engine (e.g., a steam engine). The embodiments of the pressure wave generator disclosed herein may be used for generation of other energy forms which could result from a concentration of the acoustic energy. Such energy forms can be used for generation of localized hot spots, ultraviolet (UV) radiation, x-rays, medical isotopes, neutrons, fusion, and by-products of such acoustic energy conversion and concentration. For example, some embodiments of the pressure wave generator can be used to increase the pressure in a nuclear reaction chamber containing a medium (such as liquid lead or liquid lead-lithium) such that nuclear reaction rates are increased sufficiently to provide neutron generation or energy generation through fusion reactions.

While particular elements, embodiments and applications of the present disclosure have been shown and described, it will be understood, that the scope of the disclosure is not limited thereto, since modifications can be made without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The example calculations, simulations, results, graphs, values, and parameters of the embodiments described herein are intended to illustrate and not to limit the disclosed embodiments. Other embodiments can be configured and/or operated differently than the illustrative examples described herein. Indeed, the novel methods and apparatus described herein may be embodied in a variety of other forms; furthermore, various omissions, substitutions and changes in the form of the methods and systems described herein may be made without departing from the spirit of the inventions disclosed herein.

What is claimed is:

1. A pressure wave generator for generating a pressure wave, the pressure wave generator comprising:
   a piston having a body with a first surface and a second surface;
   a housing having an inner bore, a first end, and a second end;
   a sabot configured to carry the piston within the inner bore from the first end towards the second end along a longitudinal axis of the inner bore;
   an impact surface at the second end of the housing in communication with the inner bore, the impact surface capable of being coupled to a medium;
   a driver configured to apply a force to the sabot to accelerate the sabot towards the second end of the inner bore; and
   a brake configured to apply a restraining force to the sabot to slow down the sabot so that the piston becomes at least partially separated from the sabot.

2. The pressure wave generator of claim 1, wherein a mass of the sabot is less than a mass of the piston.

3. The pressure wave generator of claim 1, wherein the sabot comprises a mechanical retainer configured to detachably secure the piston to the sabot.

4. The pressure wave generator of claim 1, wherein the driver comprises a pressurized fluid source and one or more fluid ports in fluid communication with the pressurized fluid source configured to deliver pressurized gas to the inner bore to accelerate the sabot.

5. The pressure wave generator of claim 1, wherein the driver comprises a plurality of conducting rails and a power source in electrical communication with the conducting rails, the sabot comprising a sliding armature between the conducting rails.

6. The pressure wave generator of claim 1, wherein the brake comprises a magnetic eddy current brake.

7. The pressure wave generator of claim 1, further comprising a lock configured to engage the piston during acceleration of the sabot and to disengage the piston during deceleration of the sabot.

8. The pressure wave generator of claim 7, wherein the lock comprises an electromagnet mounted to the sabot and a power source in electrical communication with the electromagnet.

9. The pressure wave generator of claim 8, wherein:
   the power source is electrically coupled to the electromagnet by a power line; and
   the pressure wave generator further comprises a control rod coupled to the sabot, wherein at least portion of the control rod is disposed in the inner bore of the housing, the control rod being configured to accommodate the power line.

10. The pressure wave generator of claim 7, wherein:
    the sabot comprises an inner cavity into which the piston is inserted;
    the sabot comprises ports in communication with the inner cavity; and
    the lock comprises a vacuum source fluidly coupled to the ports in the sabot and operable to create vacuum in the inner cavity, thereby suctioning the piston to the sabot when the vacuum source is turned on.

11. The pressure wave generator of claim 1, further comprising a pumping system in fluid communication with a port of the inner bore of the housing near the second end of the housing and operable to reduce the pressure within the inner bore.

12. An apparatus comprising:
a piston;
a sabot configured to carry the piston along a pathway;
a driver configured to accelerate the sabot along the pathway; and
a magnetic brake configured to decelerate the sabot so that the piston is at least partially separated from the sabot.

13. The apparatus of claim 12, wherein a mass of the sabot is less than a mass of the piston.

14. The apparatus of claim 12, further comprising a lock comprising an electromagnet mounted to the sabot, and a power source in electrical communication with the electromagnet to lock the piston to the sabot.

15. The apparatus of claim 12, wherein the magnetic brake comprises an eddy current brake.

16. The apparatus of claim 12, wherein the sabot comprises a permanent magnet around the sabot.

17. The apparatus of claim 12, wherein the driver comprises a pneumatic driver, a hydraulic driver, a rail gun driver, a linear motor, or a linear induction driver.

18. The apparatus of claim 12, further comprising a transducer at an end of the pathway, wherein the apparatus is configured such that the piston impacts the transducer after the piston has been at least partially separated from the sabot.

19. The apparatus of claim 18, further comprising a pressurized fluid system configured to drive the sabot and the piston back along the pathway after the piston impacts the transducer.

20. The apparatus of claim 12, wherein:
the sabot and the piston are configured to move along the pathway inside an inner bore of a housing; and
the apparatus further comprises a pumping system configured to at least partially evacuate the inner bore.

* * * * *